UNITED STATES PATENT OFFICE.

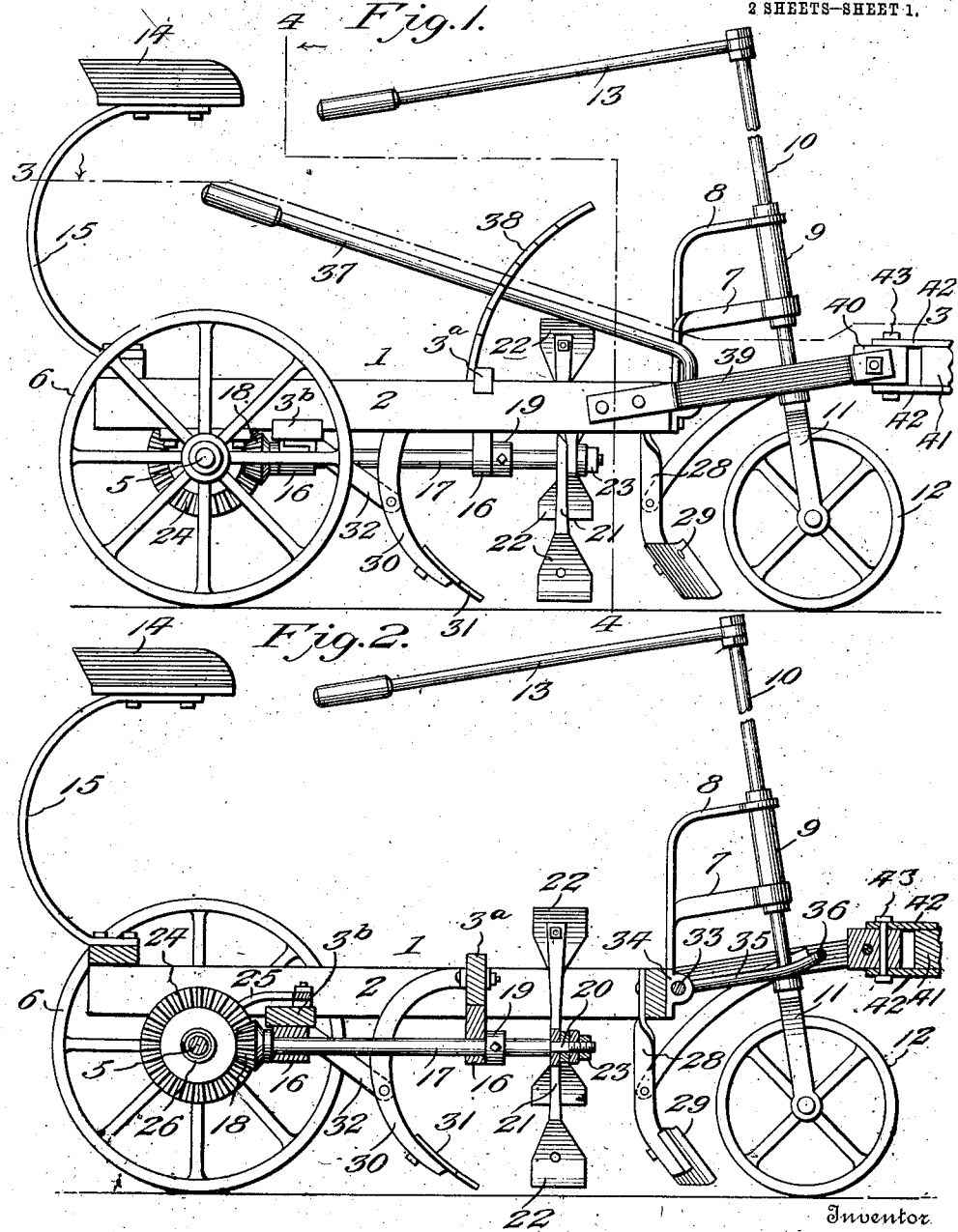

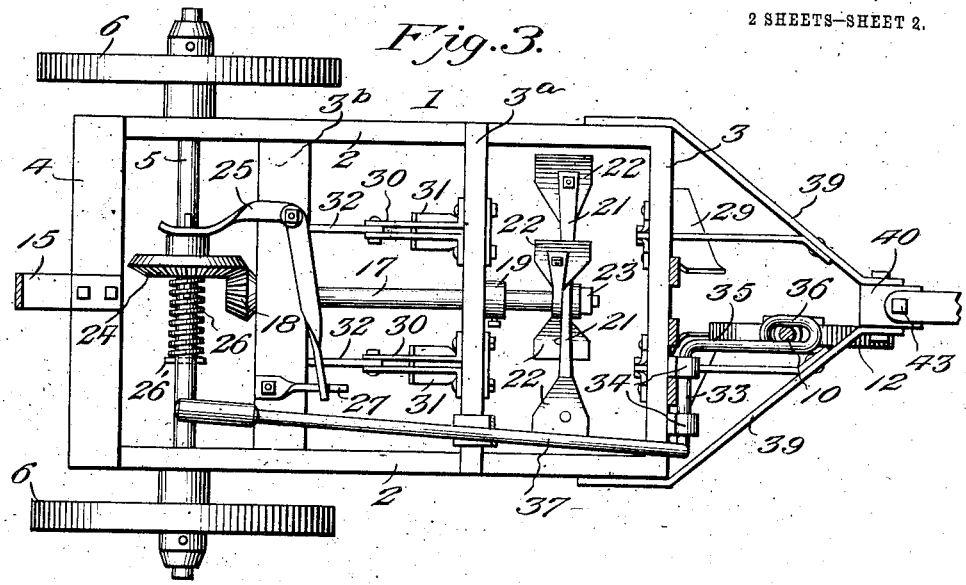
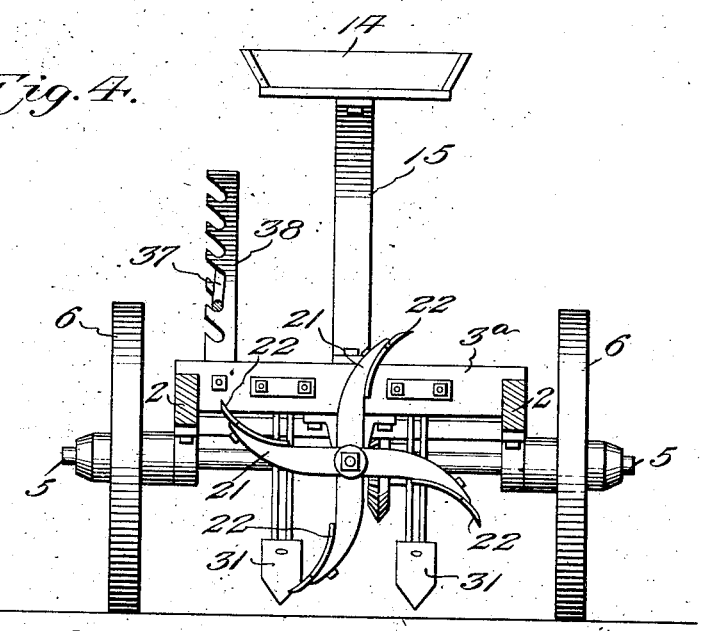

JAMES S. VAUGHAN, OF LEOTA, MISSOURI, ASSIGNOR OF ONE-HALF TO J. M. VAUGHAN, OF LEOTA, MISSOURI.

COTTON-CHOPPER.

1,091,258.  Specification of Letters Patent.  Patented Mar. 24, 1914.

Application filed November 18, 1911. Serial No. 660,957.

*To all whom it may concern:*

Be it known that I, JAMES S. VAUGHAN, a citizen of the United States, and a resident of Leota, in the county of Howell and State of Missouri, have invented certain new and useful Improvements in Cotton-Choppers, of which the following is a specification, reference being had to the accompanying drawings.

This invention relates to improvements in cotton choppers.

The object of the invention is to provide a machine of this character having an improved means for guiding and steering the same whereby the machine may be readily kept in line with the rows of plants.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification and in which like numerals of reference indicate similar parts in the several views Figure 1, is a side view of my improved cotton chopper. Fig. 2, is a central vertical longitudinal section thereof. Fig. 3, is a horizontal sectional view on the line 3, 3, of Fig. 1. Fig. 4, is a vertical cross sectional view on the line 4, 4, of Fig. 1.

My improved cotton chopper comprises a main supporting frame 1, consisting of longitudinal side bars 2, a front bar 3, rear cross bar 4, and intermediate cross bars 3ª and 3ᵇ. On the lower edges of the side bars near their rear ends are secured bearings in which is revolubly mounted a rear supporting and driving shaft or axle 5. On the ends of the axle are fixedly mounted driving and supporting wheels 6.

The forward end of the frame is supported by hangers 7 and 8, the upper ends of which are bent or curved forwardly and secured to a sleeve 9, in which is slidably and revolubly mounted a steering and supporting rod 10, on the lower end of which is formed a forked head 11 having revolubly mounted in its lower end a front supporting and steering wheel 12. On the upper end of the steering rod is fixedly mounted a steering lever 13, which extends back within convenient reach of the driver from his seat 14, the standard 15 of which is secured to the rear cross bar 4, as shown. By thus arranging the steering wheel 12, it will be seen that the machine may be readily guided or held in a straight course.

Revolubly mounted in suitable bearings 16, secured to the lower side of the intermediate cross bars 3ª and 3ᵇ is a chopping hoe shaft 17, on the rear end of which is fixedly mounted a bevel gear pinion 18. On the shaft adjacent to the forward side of the front bearing is a stop collar 19, which together with the pinion 18 holds the shaft against longitudinal movement. The forward end of the shaft 17 has formed thereon a reduced, squared portion 20, with which are removably engaged radially projecting pairs of curved hoe supporting and operating arms 21, to which are secured curved chopping hoes 22. The forward extremity of the shaft 17 is threaded, and onto said threaded end is screwed a clamping nut 23, between which and the arms 21 is arranged a washer, and by means of which the arms of the hoes are firmly clamped together and into engagement with the shoulder formed by the reduced end of the shaft. By thus fastening the arms 21 to the shaft, one of the same may be removed and a washer arranged in its place to fill up the space on the shaft. By removing one of the pairs of arms 21, the hoes on the remaining arms will chop out the plants at greater distance apart. By this means more or less plants may be left standing, as desired.

Slidably keyed to the shaft or axle 5 is a beveled driving gear 24, which is adapted to be shifted and held in engagement with the pinion 18 on the shaft 17 by a bell-crank shifting lever 25, pivotally mounted on the cross bar 3ᵇ as shown. The gear 24 is shifted into engagement with the pinion 18 against the pressure of a coiled spring 26, arranged on the axle 5 between the gear and a stop pin 26'. The free end of the lever 25 when actuating to shift the gear 24 is locked or fastened by a notched keeper plate 27, with which the end of the lever is engaged, as shown in Fig. 3 of the drawings. When the lever is released from its keeper, the spring 26 will shift the gear 24 back out of engagement with the pinion 18, thus throwing the chopping hoes out of gear.

Arranged in front of the chopping hoes and secured to the lower end of the standards 28, are scraping blades 29, which are designed to work on opposite sides of the rows of plants and to scrape away all trash and weeds which might clog the chopping hoes. Secured to the cross bar 3ª are standards 30, to the lower ends of which are secured cultivator blades or shovels 31, said blades or shovels being adapted to work the soil on each side of the rows, thus cultivating the plants simultaneously with the chopping out of the same. The standards of the cultivator shovels are firmly held by braces 32, secured thereto and to the cross bar 3ª.

In order to lift the hoes and the scraping and cultivating blades above the ground when the machine is being moved from place to place, I provide a raising and lowering mechanism, comprising a rock shaft 33 mounted in bearings 34, secured to the front cross bar of the frame. On the inner end of the shaft is formed a forwardly extending crank arm 35 having on its outer end a loop 36, which is loosely engaged with the lower portion of the steering rod 10, and is adapted to bear on the upper end of the steering head, as shown in Figs. 2 and 3 of the drawings. On the outer end of the rock shaft is formed a rearwardly extending raising and lowering lever 37 which projects back to within convenient reach from the driver's seat, whereby when the lever is raised the loop 36 on the arm 35 is engaged with the upper end of the bearing head 11, which serves as a fulcrum for the raising and lowering lever, whereby when the shaft is rocked in one direction or the other, the front end of the supporting frame will be correspondingly raised and lowered. The lever 37 is locked in an operative position to support the frame and hold the hoes, scraping and cultivating blades in an elevated position by means of a segmental upwardly extending rack bar 38, secured to the frame as shown.

Bolted or otherwise secured to the front ends of the side bars of the frame are forwardly extending, converging draft bars 39, between the outer ends of which is pivotally secured a tongue attaching block 40, said block being pivoted to turn in a vertical plane. To the block 40 is secured a draft tongue 41, said tongue having on its inner end upper and lower attaching bars 42, which are pivotally secured to the upper and lower sides of the block 40 by a pivot bolt 43. By thus attaching the tongue, the same is free to swing in a vertical and a horizontal plane. This manner of attaching the tongue permits the machine to be readily controlled by the steering mechanism hereinbefore described.

From the foregoing description taken in connection with the accompanying drawings, the construction and operation of the invention will be readily understood without requiring a more extended explanation.

Various changes in the form, proportion and minor details of construction may be resorted to without departing from the principle or sacrificing any of the advantages as claimed.

Having thus described my said invention, what I claim as new and desire to secure by United States Letters Patent is:

In a device of the character described, the combination with a frame, of a shaft secured near one end of said frame, supporting wheels fixed to said shaft, a rock shaft secured to the forward end of said frame, a crank arm extending from said rock shaft ending in a loop, a sleeve vertically secured to the forward end of said frame, a steering rod revolubly held within said sleeve and passing through said loop, a forked head at the lower end of said rod, said loop resting upon said forked head, a wheel within said fork, a lever secured to said rock shaft, and a segmental rack bar secured to said frame and engaged by said lever.

In testimony whereof I affix my signature, in presence of two witnesses.

JAMES S. VAUGHAN.

Witnesses:
CHARLEY WAGENER,
ED. MATLOCK.